(12) United States Patent
Hsu

(10) Patent No.: US 12,503,146 B2
(45) Date of Patent: Dec. 23, 2025

(54) DRAWER CART STRUCTURE

(71) Applicant: YOUNG BRIOHAM ENTERPRISE CO., LTD., Changhua County (TW)

(72) Inventor: Ching-Lin Hsu, Changhua County (TW)

(73) Assignee: YOUNG BRIOHAM ENTERPRISE CO., LTD., Changhua County (TW)

( * ) Notice: Subject to any disclaimer, the term of this patent is extended or adjusted under 35 U.S.C. 154(b) by 296 days.

(21) Appl. No.: 18/480,476

(22) Filed: Oct. 3, 2023

(65) Prior Publication Data
US 2024/0174277 A1    May 30, 2024

(30) Foreign Application Priority Data
Nov. 24, 2022   (TW) ................................ 111212937

(51) Int. Cl.
*B62B 3/02*    (2006.01)
*B62B 3/00*    (2006.01)
*B62B 3/14*    (2006.01)

(52) U.S. Cl.
CPC ............... *B62B 3/005* (2013.01); *B62B 3/02* (2013.01); *B62B 3/14* (2013.01); *B62B 2205/006* (2013.01); *B62B 2205/32* (2013.01)

(58) Field of Classification Search
CPC .. B62B 3/005; B62B 3/02; B62B 3/14; B62B 3/002; B62B 3/1468; B62B 3/16; B62B 3/165; B62B 3/18; B62B 3/184; B62B 2205/006; B62B 2205/32
See application file for complete search history.

(56) References Cited

U.S. PATENT DOCUMENTS

| | | | |
|---|---|---|---|
| 9,187,111 B2 * | 11/2015 | Lai ....................... | A47B 57/404 |
| 10,028,582 B2 * | 7/2018 | Nilsson .................. | A47B 55/00 |
| 10,479,386 B2 * | 11/2019 | Duru ...................... | B62B 3/006 |
| 10,717,454 B1 * | 7/2020 | Alvarez ................... | B62B 3/02 |
| 10,960,910 B1 * | 3/2021 | Garcia ..................... | B62B 3/02 |
| 11,001,286 B2 * | 5/2021 | Liu ......................... | A47B 57/36 |
| 2008/0246377 A1 * | 10/2008 | Huang .................... | A47B 88/40 |
| | | | 312/334.8 |
| 2013/0063012 A1 * | 3/2013 | Lu ........................... | B25H 3/06 |
| | | | 312/334.7 |

* cited by examiner

*Primary Examiner* — John D Walters

(57) ABSTRACT

A drawer cart structure includes a first drawer trolley, a second drawer trolley, a plurality of drawers matching the first drawer trolley and the second drawer trolley, and a packaging box, wherein the drawers can be stacked separately into a first drawer set and a second drawer set according to the required number of drawers of the first drawer trolley and the second drawer trolley. The first drawer trolley and the second drawer trolley are in the form of open frame structures except for two sides and the top. The first drawer trolley and the second drawer trolley approach each other in opposite directions and from the bottoms of the two drawer trolleys, so that the first drawer trolley and the second drawer trolley are stacked crosswise and there is a distance between the tops of the first drawer trolley and the second drawer trolley.

8 Claims, 9 Drawing Sheets

DRAWER CART STRUCTURE

BACKGROUND OF THE INVENTION

Field of the Invention

This invention relates to a drawer cart structure, in particular to a drawer cart structure that saves packaging space and saves assembling time.

Description of the Related Art

A drawer cart is an equipment with several drawers for storage. The drawer cart can be moved to a fixed point for use at any time, and because of its movability, the dust beneath the drawer cart is also easier to clean. No matter in a home environment or In the factory, the drawer cart can be moved and stored at any time has its practicality.

FIG. 8 and FIG. 9 illustrate a conventional drawer cart structure. Drawer cart 80 has a frame 81, the frame 81 is provided with several drawers 82 for storage. Several reinforcing rods 83 are installed at the bottom of the frame 81, and a package 90 is used to pack and transport the drawer cart 80. During use, the conventional drawer cart 80 only needs to be taken out from the package 90 and used without the need to prepare tools to assemble the connecting members, thereby saving the time required to start using. It is easy to see from the above the shortcomings of the conventional drawer cart 80. Since the package 90 can only package one drawer cart 80. After the drawer cart 80 is produced, packaged and shipped, the package 90 occupies a fixed volume and there is a certain pressure on storage. Affected by the reinforcement rod 83, the frame 81 cannot be stacked to save space, so that and the storage and packaging efficiency of the drawer cart 80 needs to be improved.

Although the frame 81 of the drawer cart 80 can be taken apart into multiple parts to maximize the packaging 90, however, the user needs to spend a lot of time and effort to assemble it. For impatient consumers or where hundreds of drawer carts are needed, such drawer carts sold in the form of DIY furniture can save packaging space but consume a lot of time. The time and energy required are undoubtedly unattractive to some consumers.

Furthermore, whether in warehousing or transportation, the larger the volume occupied by the packaging also means that the cost of warehousing or transportation will also increase. For consumers who purchase the drawer carts, the increase in cost also means that they must pay more for the product. The manufacturers should reduce the packaging volume as much as possible while increasing the supply quantity, and they must also consider saving the time of the consumers after purchase.

SUMMARY OF THE INVENTION

The technical problem to be solved by this invention is to provide a drawer cart structure in view of the above-mentioned deficiencies in the prior art.

The present application discloses a drawer cart structure, which includes a first drawer trolley and a second drawer trolley, a plurality of drawers matching the first drawer trolley and the second drawer trolley, and a packaging box, wherein the drawers can be stacked separately into a first drawer set and a second drawer set according to the required number of drawers of the first drawer trolley and the second drawer trolley. The first drawer trolley and the second drawer trolley are in the form of open frame structures except for two sides and the top. The first drawer trolley and the second drawer trolley approach each other in opposite directions and from the bottoms of the two drawer trolleys, so that the first drawer trolley and the second drawer trolley are stacked crosswise and there is a distance between the tops of the first drawer trolley and the second drawer trolley. A front-to-rear accessible accommodation space is formed between the first drawer trolley and the second drawer trolley for placing the first drawer set and the second drawer set. Then all the first drawer trolley and the second drawer trolley are put into the packaging box to complete the storage and packaging. The length of the accommodation space is determined by the distance between the tops of the first drawer trolley and the second drawer trolley and is sufficient to accommodate the combined length of the first drawer set and the second drawer set. The height of the accommodation space is determined by the distance between the sides of the first drawer trolley and the second drawer trolley and is sufficient to accommodate the height of the first drawer set and the second drawer set.

Further, the first drawer trolley and the second drawer trolley are each provided with an inverted U-shaped side frame on both sides. The bottom of each side frame is provided with a caster for sliding. A top combination bar is designed at the front and the rear between two sides of the tops of the two side frames, and a top plate is provided on the top combination bar. There are several slide rails symmetrically provided on the inside of the two side frames, so that the first drawer trolley and the second drawer trolley are in the form of open frame structures except for two sides and the top. The top of the drawer is provided with a sliding rib for inserting into the two slide rails for sliding. The surface of the drawer is provided with a flange below the sliding rib to prevent the two sliding ribs from being too close when the drawer is stacked.

Furthermore, a bottom combination rod is provided between one side of the bottom of the two side frames.

Preferably, the distance between the tops of the first drawer trolly and the second drawer trolly is between 2.1 times and 2.3 times the width of the drawer.

Comparing to the conventional drawer cart, the present disclosure has the following advantages. The present invention provides a drawer cart structure. The first drawer trolley and the second drawer trolley are open frame structures except for both sides and the top, which can save the user's time in building a frame body for matching the drawers. According to the required number of drawers of the first drawer trolley and the second drawer trolley, the drawers can be separately stacked into a first drawer set and a second drawer set. With the first drawer trolley and the second drawer trolley. The first drawer trolley and the second drawer trolley approach each other in opposite directions and from the bottoms of the two drawer trolleys. A front-to-rear accessible accommodation space is formed between the first drawer trolley and the second drawer trolley for placing the first drawer set and the second drawer set. Then all the first drawer trolley and the second drawer trolley are put into the packaging box to complete the storage and packaging. Hence, the present disclosure has the effect of saving space, reducing the packaging volume, and can effectively shorten the assembly time.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
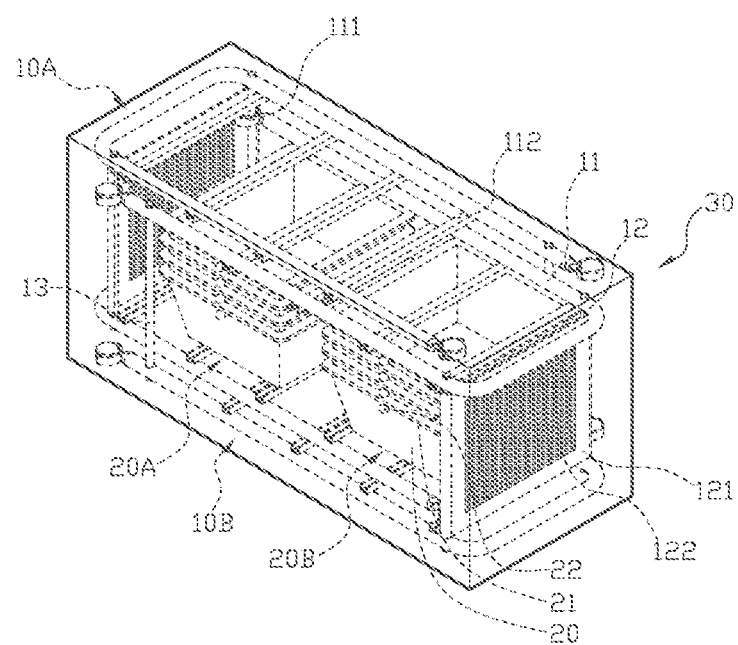
FIG. 1 illustrates a perspective view of the present invention.
Figure 2:
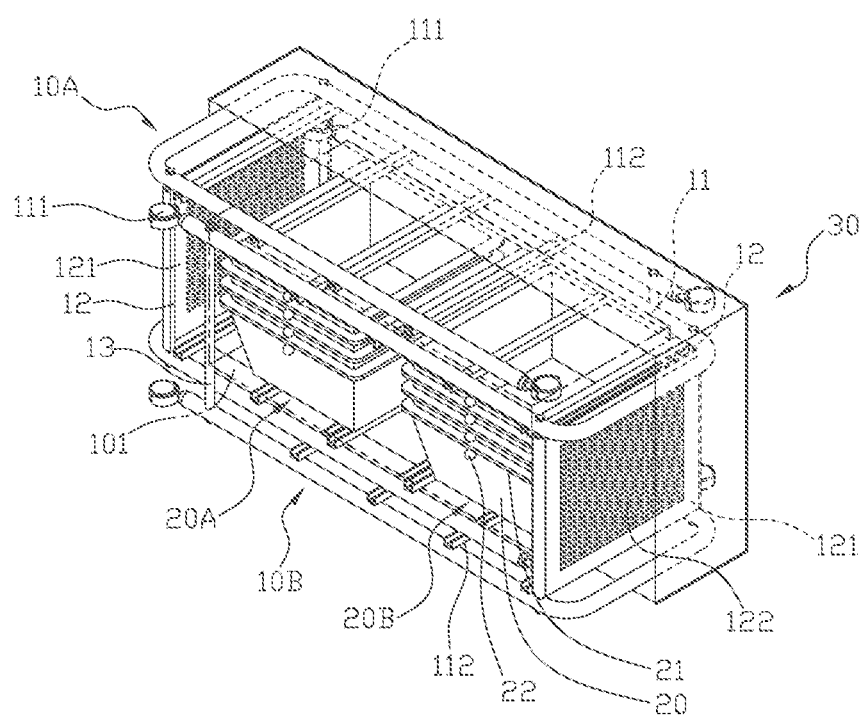
FIG. 2 illustrates a schematic diagram of the internal structure in the packaging state of the present invention.
Figure 3:
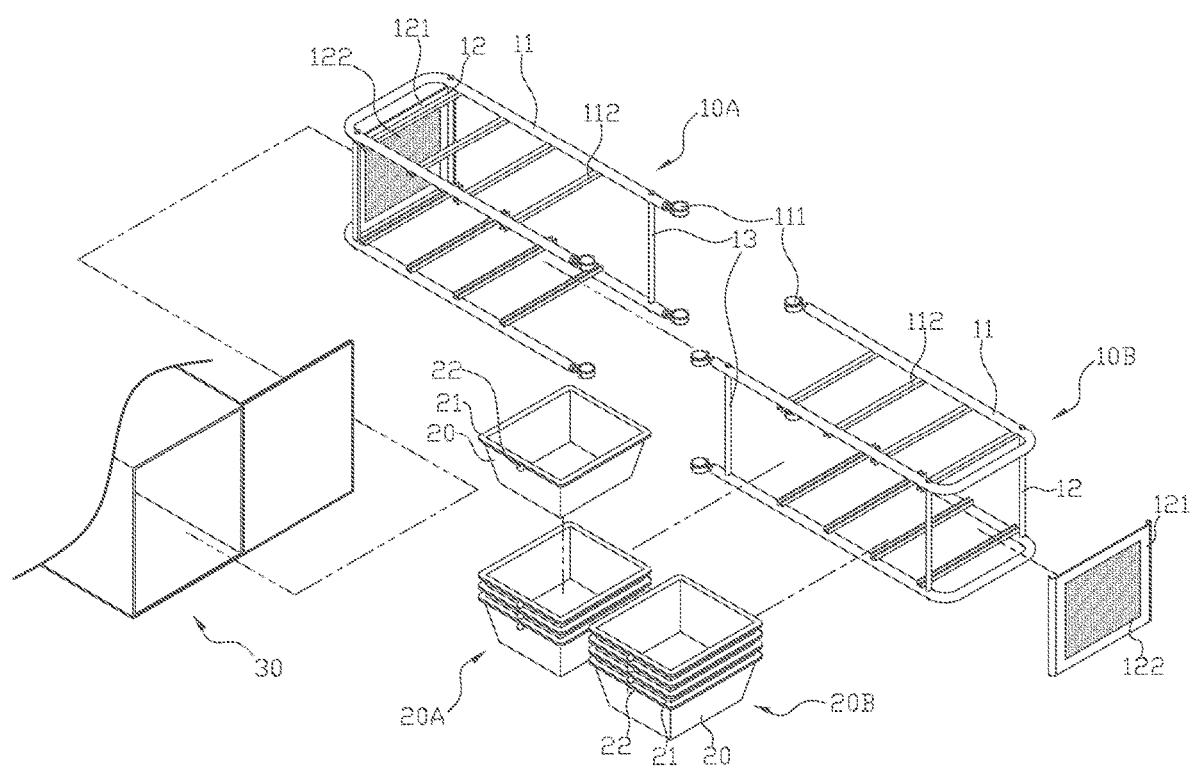
FIG. 3 illustrates an exploded view of the present invention.
Figure 4:
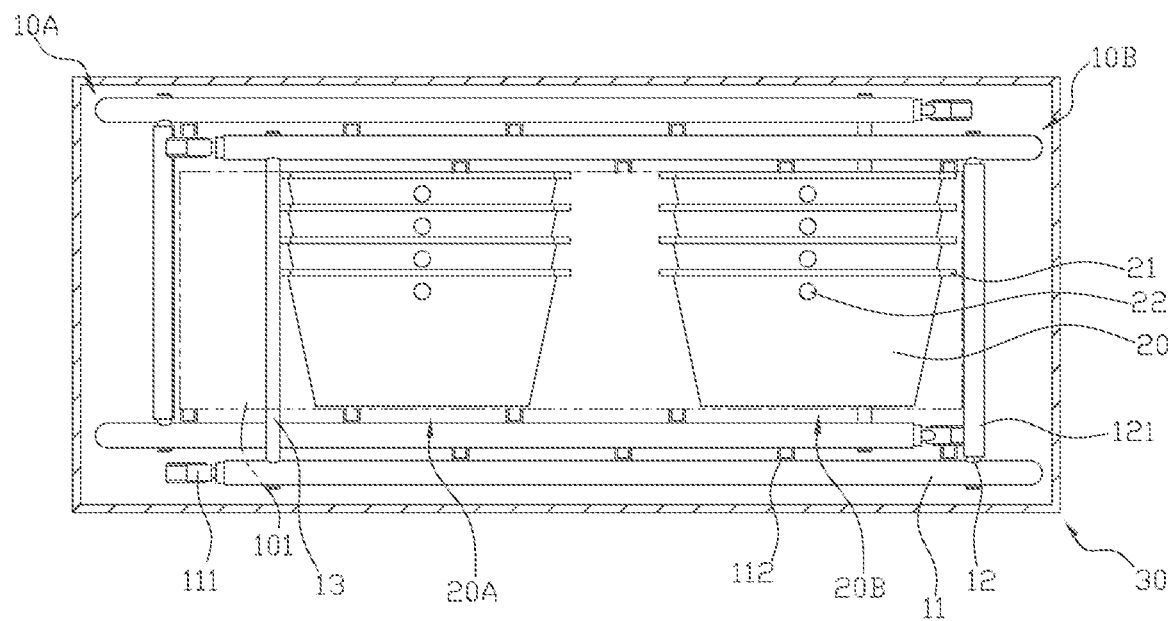
FIG. 4 illustrates a front cross-sectional view of the present invention.
Figure 5:
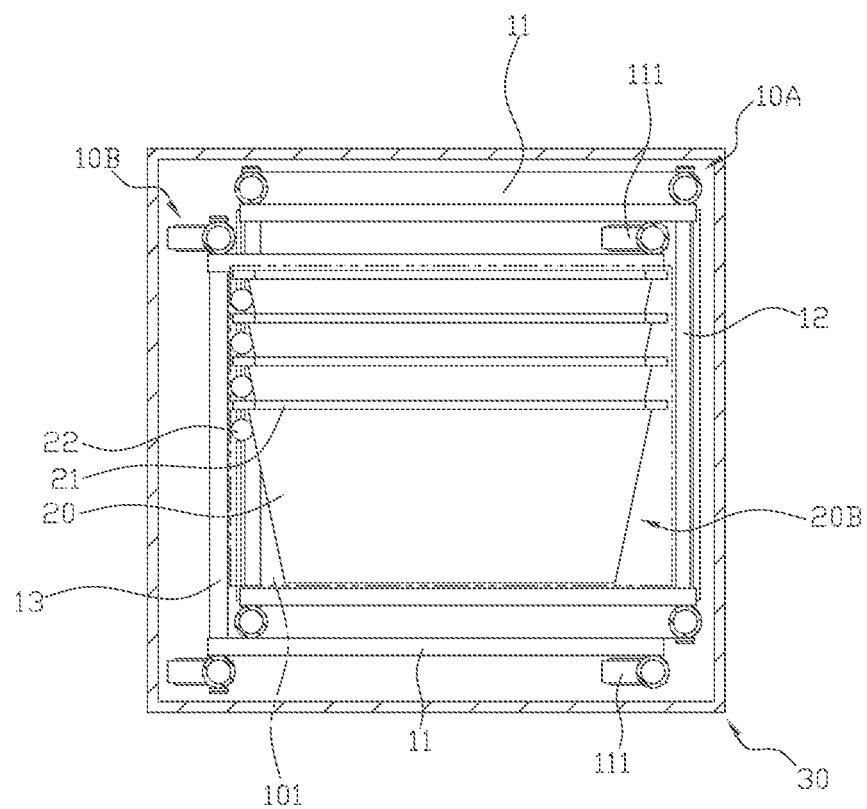
FIG. 5 illustrates a side cross-sectional view of the present invention.

As shown in FIG. 1 and FIG. 2, the present application discloses a drawer cart structure, which includes a first drawer trolley 10A and a second drawer trolley 10B, a plurality of drawers 20 matching the first drawer trolley 10A and the second drawer trolley 10B, and a packaging box 30. The drawers 20 can be stacked separately into a first drawer set 20A and a second drawer set 20B according to the required number of drawers 20 of the first drawer trolley 10A and the second drawer trolley 10B. As shown in FIG. 3, the first drawer trolley 10A and the second drawer trolley 10B are in the form of open frame structures except for two sides and the top. The first drawer trolley 10A and the second drawer trolley 10B approach each other in opposite directions and from the bottoms of the two drawer trolleys, so that the first drawer trolley 10A and the second drawer trolley 10B are stacked crosswise and there is a distance between the tops of the first drawer trolley 10A and the second drawer trolley 10B. A front-to-rear accessible accommodation space 101 is formed between the first drawer trolley 10A and the second drawer trolley 10B for placing the first drawer set 20A and the second drawer set 20B. Then all the first drawer trolley 10A and the second drawer trolley 10B are put into the packaging box 30 to complete the storage and packaging. As shown in FIG. 4 and FIG. 5, the length of the accommodation space 101 is determined by the distance between the tops of the first drawer trolley 10A and the second drawer trolley 10B and is sufficient to accommodate the combined length of the first drawer set 20A and the second drawer set 20B. The height of the accommodation space 101 is determined by the distance between the sides of the first drawer trolley 10A and the second drawer trolley 10B and is sufficient to accommodate the height of the first drawer set 20A and the second drawer set 20B.

As shown in FIG. 2, the front-to-rear accessible accommodation space 101 is formed between the first drawer trolley 10A and the second drawer trolley 10B for placing the drawers 20 in a maximum space saving arrangement. In addition, the first drawer trolley 10A and the second drawer trolley 10B are in the form of open frame structures except for two sides and the top, therefore the user does not need any tool to assemble the frame for placing the drawers 20. The user only needs to take out the first drawer trolley 10A, the second drawer trolley 10B, the first drawer set 20A, and the second drawer set 20B from the packaging box 30 and assemble them separately. The time that the user needs to use tools and assemble several components is therefore reduced, and a balance between saving assembly time and streamlining the packaging volume is also achieved.

In view of the above, after the manufacturer has produced the first drawer trolley 10A, the second drawer trolley 10B, and the drawers 20, the drawers 20 are stacked and divided into the first drawer set 20A and the second drawer set 20B and are placed in the accommodation space 101, so that the first drawer trolley 10A, the second drawer trolley 10B and the drawers 20 can be placed in the packaging box 30 in the most volume-saving manner. Because of the effect of saving space during storage and shipment, it is more convenient for the user to save space during purchase and transportation. The most space-saving storage method after disassembly can still be to cross-stack the first drawer trolley 10A and the second drawer trolley 10B, and place the first drawer set 20A and the second drawer set 20B in the accommodation space 101 before putting into the packaging box 30 to complete the storage and packaging. This design can save the user's storage space and has the effect of saving space for storage and packaging.

Moreover, the first drawer trolley 10A, the second drawer trolley 10B, and the drawers 20 can be packed in the packaging box 30 in the most space-saving manner, and due to the utilization of space, the gap between parts after packaging can be minimized and the cushioning materials used to prevent collisions can be reduced, which has an environmentally friendly effect. When the manufacturer wants to send the first drawer trolley 10A and the second drawer trolley 10B at once during shipment, the manufacture only needs one packaging box 30, which can reduce the volume occupied in transportation and storage. Due to the reduction in cost, the sale price of the first drawer trolley 10A and the second drawer trolley 10B can also be reduced. Because the occupied volume is reduced, which is convenient for transportation and storage, and the price is more favorable, and the saving of assembly time, the product will be more attractive to the users, so that achieves a win-win situation between users and manufacture. It is extremely attractive to consumers who do not want to waste time and effort on DIY, and can save a lot of money when purchasing hundreds of drawer trolleys by reducing storage space, transportation costs, assembly time and reducing waste generated afterwards. Hence, the drawer cart structure of the present invention can be more competitive in the market.

Figure 6:
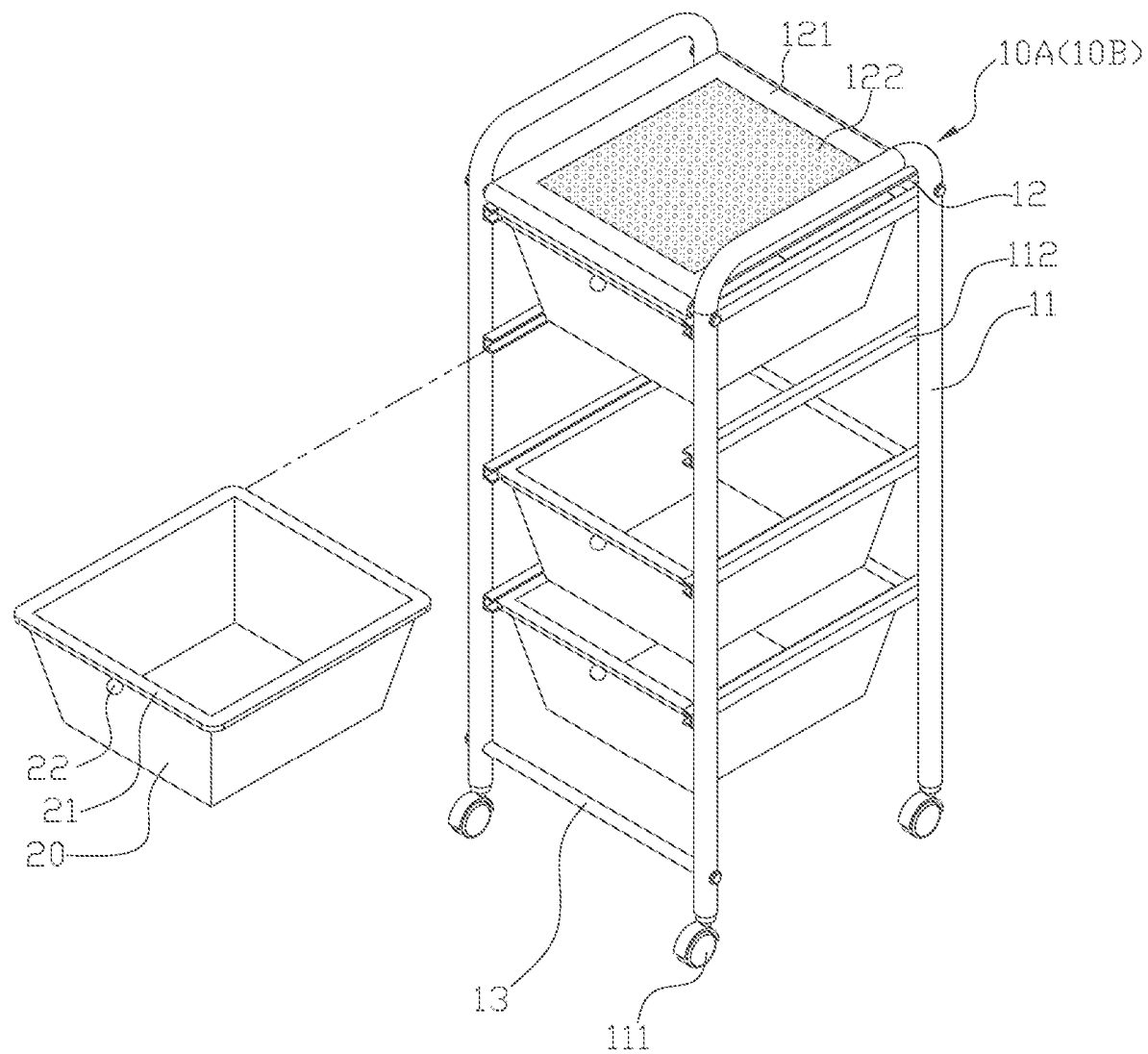
FIG. 6 illustrates a schematic diagram of assembling drawer according to the present invention.
Figure 7:
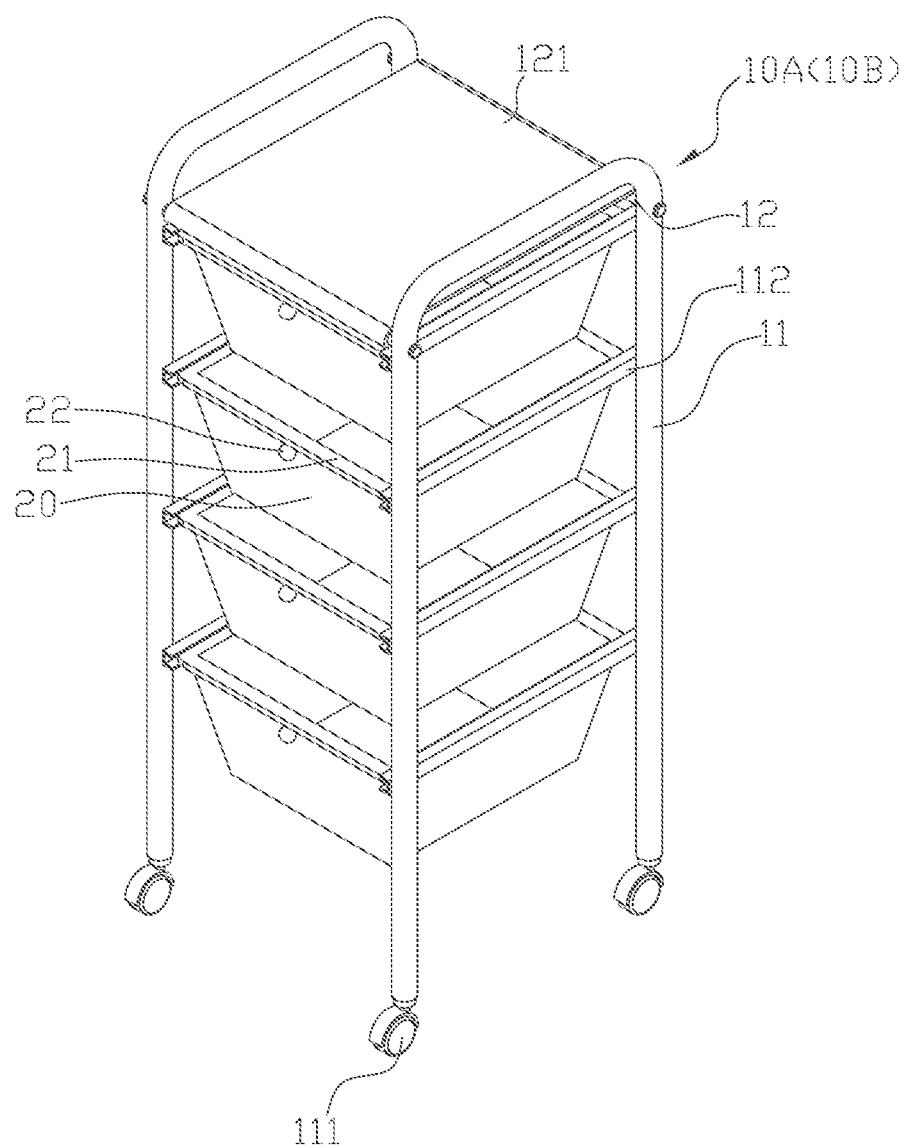
FIG. 7 illustrates a schematic diagram of another embodiment of the present invention in an assembled state.
Figure 8:
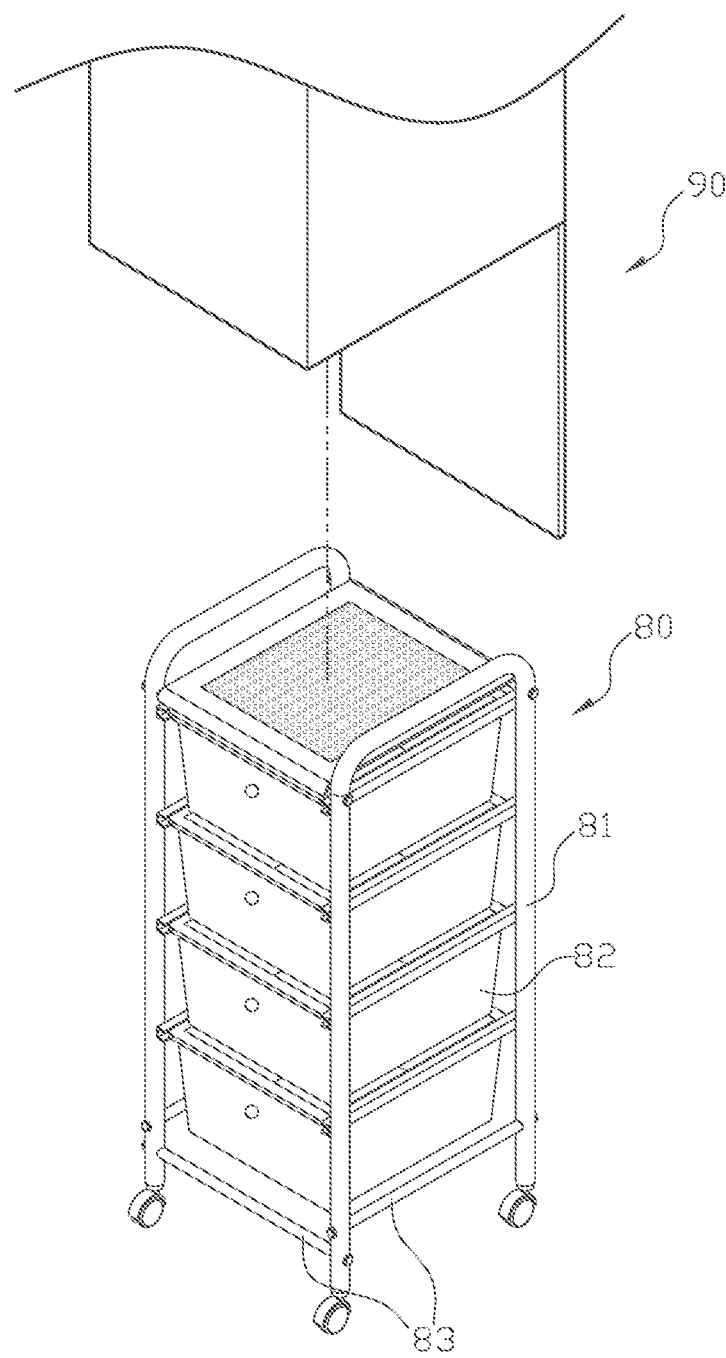
FIG. 8 illustrates a schematic diagram of a conventional drawer cart for packaging.
Figure 9:
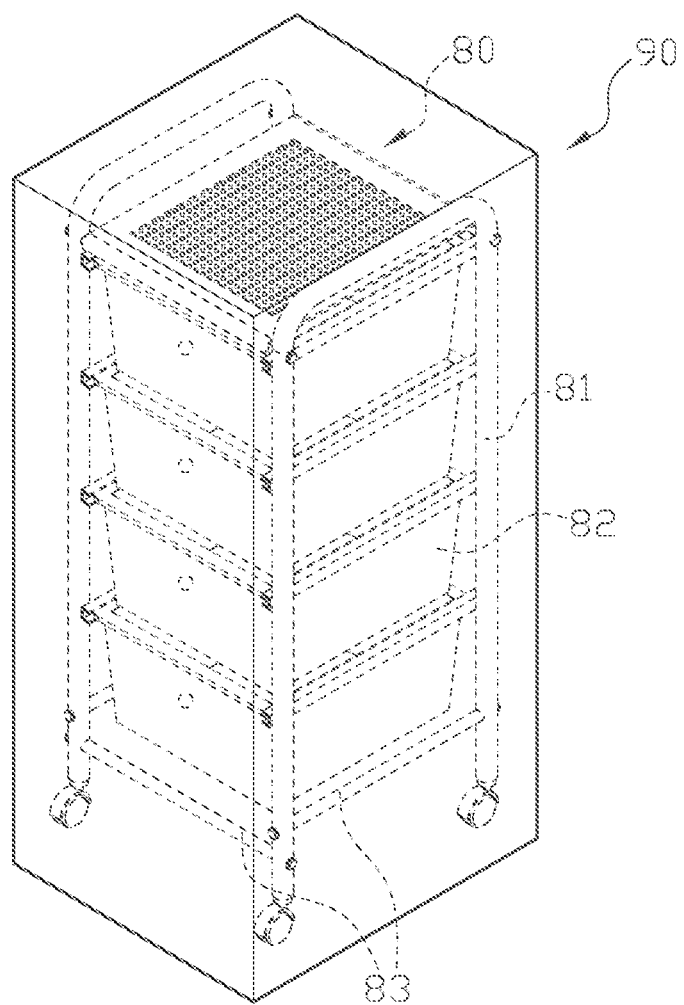
FIG. 9 illustrates a schematic diagram of the conventional drawer cart packaging in its completed state.

Further embodiments can be found in FIGS. 5-7. The first drawer trolley 10A and the second drawer trolley 10B are each provided with an inverted U-shaped side frame 11 on both sides. The bottom of each side frame 11 is provided with a caster 111 for sliding. A top combination bar 12 is designed at the front and the rear between two sides of the tops of the two side frames 11, and a top plate 121 is provided on the top combination bar 12. There are several slide rails 112 symmetrically provided on the inside of the two side frames 11, so that the first drawer trolley 10A and the second drawer trolley 10B are in the form of open frame structures except for two sides and the top. The top of the drawer 20 is provided with a sliding rib 21 for inserting into the two slide rails 112 for sliding. The surface of the drawer 20 is provided with a flange 22 below the sliding rib 21 to prevent the two sliding ribs 21 from being too close when the drawers 20 are stacked.

As shown in FIGS. 6 and 7, during actual assembly, the first drawer trolley 10A or the second drawer trolley 10B is placed upright and the drawers 20 are placed one by one combined with the slide rail 112, and then it can be used. At this time, the flange 22 can act as a handle to hold and pull the drawers 20 so that the sliding rib 21 can slide in the slide rail 112. When not in use, the drawers 20 can also be disassembled one by one from the slide rail 112, and the drawers 20 can be stacked to form the first drawer set 20A and the second drawer set 20B for storage. The existence of the flange 22 can prevent the two sliding ribs 21 from being too close to each other and making it difficult to separate the drawers 20. When separating the drawers 20, the user can also apply force by holding the flange 22. Since the side frame 11 is in an inverted U shape, when the packaging box 30 is placed horizontally on the ground, the two side frames 11 can be used as handles to pull out the first drawer trolley 10A or the second drawer trolley 10B. With the above labor-saving effect, the invention further has the effect of easy assembly. The above advantages can favor to some consumers who are resistant to spending time and effort on DIY.

As shown in FIGS. 1-3 in conjunction with FIG. 6, the present invention provides a drawer cart structure, in which a bottom combination rod 13 has the function of reinforcing the structure, and because the bottom combination rod 13 is provided between only one side of the bottom of the two side frames 11, it will not hinder the crosswise stacking of the first drawer trolley 10A and the second drawer trolley 10B.

The present invention provides a drawer cart structure, in which the two ends of the top plate 121 are buckled on the top combination rod 12, and can be assembled and disassembled at any time by pulling.

As shown in FIG. 6, the present invention provides a drawer cart structure, in which the surface of the top plate 121 is provided with several through holes 122, which are breathable, prevent water accumulation, save materials, and have the lightweight efficiency.

As shown in FIG. 7, which is another embodiment of the present invention, the present invention provides a drawer cart structure, wherein the surface of the top plate 121 is flat without holes and can be used as a flat surface to place items stably.

As shown in FIGS. 1-3, the present invention provides a drawer cart structure, in which the number of drawers 20 is eight. When the first drawer trolley 10A and the second drawer trolley 10B are assembled, it has enough separation space for easy use, achieving a balance between storage efficiency and volume.

The present invention provides a drawer cart structure, wherein the distance between the tops of the first drawer trolley 10A and the second drawer trolley 10B is between 2.1 times and 2.3 times the width of the drawers 20, and therefore there is enough clearance to place the first drawer set 20A and the second drawer set 20B while taking into account the space-saving effect.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A drawer cart structure, comprising a first drawer trolley, a second drawer trolley, a plurality of drawers matching the first drawer trolley and the second drawer trolley, and a packaging box,
    wherein the drawers can be stacked separately into a first drawer set and a second drawer set according to the required number of drawers of the first drawer trolley and the second drawer trolley;
    the first drawer trolley and the second drawer trolley are in a form of open frame structures except for two sides and a top;
    the first drawer trolley and the second drawer trolley are stacked with each other in an opposite directions from bottoms of the first drawer trolley and the second drawer trolley, so that the first drawer trolley and the second drawer trolley are stacked crosswise and a distance is formed between the tops of the first drawer trolley and the second drawer trolley;
    a front-to-rear accessible accommodation space is formed between the first drawer trolley and the second drawer trolley for placing the first drawer set and the second drawer set;
    the first drawer trolley and the second drawer trolley are capable for being put into the packaging box;
    a length of the accommodation space is determined by the distance between the tops of the first drawer trolley and the second drawer trolley and is sufficient to accommodate the combined length of the first drawer set and the second drawer set;
    a height of the accommodation space is determined by the distance between the sides of the first drawer trolley and the second drawer trolley and is sufficient to accommodate the height of the first drawer set and the second drawer set.

2. The drawer cart structure of claim 1, wherein, the first drawer trolley and the second drawer trolley are each provided with an inverted U-shaped side frame on both sides, a bottom of each side frame is provided with a caster for sliding, a top combination bar is provided at the front and the rear between two sides of the tops of the two side frames, and a top plate is provided on the top combination bar;
    a plurality of slide rails are symmetrically provided on the inside of the two side frames, so that the first drawer trolley and the second drawer trolley are in the form of open frame structures except for two sides and the top;
    a top of the drawer is provided with a sliding rib for inserting into the two slide rails for sliding;
    a surface of the drawer is provided with a flange below the sliding rib to prevent the two sliding ribs from being too close when the drawers are stacked.

3. The drawer cart structure of claim 2, wherein a bottom combination rod is provided between one side of the bottom of the two side frames.

4. The drawer cart structure of claim 2, wherein two ends of the top plate are buckled on the top combination rod and can be assembled and disassembled by pulling.

5. The drawer cart structure of claim 2, wherein a surface of the top plate is provided with a plurality of through holes.

6. The drawer cart structure of claim 2, wherein a surface of the top plate is flat without holes.

7. The drawer cart structure of claim 1, wherein a number of the drawers is eight.

8. The drawer cart structure of claim 1, wherein a distance between the tops of the first drawer trolly and the second drawer trolly is between 2.1 times and 2.3 times the width of the drawers.

* * * * *